United States Patent
Chu et al.

(10) Patent No.: US 7,953,714 B2
(45) Date of Patent: May 31, 2011

(54) METHOD FOR MAINTAINING PARALLELISM IN DATABASE PROCESSING USING RECORD IDENTIFIER SUBSTITUTION ASSIGNMENT

(75) Inventors: Lee Chu, Toronto (CA); Michael T. Ho, Richmond Hill (CA); Leo T. M. Lau, Thornhill (CA); David Tremaine, Markham (CA)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 11/849,256

(22) Filed: Aug. 31, 2007

(65) Prior Publication Data
US 2009/0063541 A1    Mar. 5, 2009

(51) Int. Cl.
*G06F 7/00* (2006.01)
(52) U.S. Cl. ......... 707/696; 707/741; 707/764; 707/803
(58) Field of Classification Search .................. 707/696, 707/741, 764, 803
See application file for complete search history.

(56) References Cited

U.S. PATENT DOCUMENTS
6,026,412 A * 2/2000 Sockut et al. ................ 707/200
* cited by examiner

*Primary Examiner* — Tim T. Vo
*Assistant Examiner* — Sangwoo Ahn
(74) *Attorney, Agent, or Firm* — Sawyer Law Group, P.C.

(57) ABSTRACT

In one implementation, a method for sustaining database processing parallelism of one or more parallelized processes to build one or more index pages using pseudo record identifiers (PRIDs) is disclosed. The method comprises generating one or more PRIDs for one or more respective internal record formats (IRFs), inserting said generated PRIDs into a respective index key, generating a relational index of the PRID and a predetermined record identifier (RID) respectively determined in relation to said IRF, and building one or more index pages in relation to the relational index by comparing said RID and said PRID for their respective IRF in said relational index, and determining which one of said RID or said PRID to insert into said index page.

18 Claims, 3 Drawing Sheets

METHOD FOR MAINTAINING PARALLELISM IN DATABASE PROCESSING USING RECORD IDENTIFIER SUBSTITUTION ASSIGNMENT

FIELD OF THE INVENTION

The present invention relates generally to databases and more specifically to sustaining database processing parallelism of one or more parallelized processes.

BACKGROUND OF THE INVENTION

The IBM DB2® Universal Database (DB2 UDB) can automatically determine the most effective degree of query parallelism to use for query performance across SMP CPUs as a maintenance task. The DB2 UDB provides an ideal environment for maintaining parallelism in many processing operations. Operatively, as used herein, the term "parallelism" means the ability to execute a command statement, perform input/output (I/O), or run certain utilities such as backup, restore or load across multiple processors, for instance.

Parallelism of operations can prove beneficial in reducing time and expense to undertake complex computing activities. Recently, automatic parallelism selection is being commercialized where during execution, complex queries can benefit from parallel processing, while simple queries can bypass the overhead of the parallel processing infrastructure. Accordingly, the decision on the degree of parallelism can be made dynamically during execution.

Operatively though challenges can arise. For instance, in LOAD (defined as a DB2 UDB database level authority and privilege that can be granted at a database level.), agents or engine dispatchable units (EDUs) which perform tasks on behalf of the database manager or an application, handle different tasks in an effort to promote parallelism and thereby reduce time and expenses. Examples of such tasks may include the formatters and the ridders.

The formatters may be many in number requiring handling and each formatter is responsible for parsing raw data from an input source and converting it into an internal record format (IRF). The formatters then pass these TRFs or records to a single RIDder.

A RIDder is one in total and is responsible for allocating extents and assigning record identifiers (RIDs) to each IRF or record. In this process, parallelism is set to a value of (either by LOAD or by a user modifying the CPU_PARALLELISM option). In this case the RIDder process is performed by the formatter.

Furthermore, in this case there will be no db21rid process. There will just be a single db21frm0 process which handles both ridding and formatting. The "db21rid" process performs the functions: SMP synchronization; Allocate RIDs; build the indexes; and it also controls the synchronization of the LOAD formatter processes.

However, for XML LOAD, XML documents are often desired to be parsed in the formatters, where, during the parsing phase, index keys are also accumulated. In the situation where there are user defined XML indexes (also used herein as "values indexes" and referred to as "XML indexes" or "Value Indexes"), one referential parameter (used herein as a "keypart") needed for accurate page building in a later step is a RID which references the original formatted IRF or record.

Unfortunately, the RID assignment is generated by a single process which is both different than that of the parsing and which may occur after the parsing, as the XML documents are often parsed in parallel ahead of time by separate processes. Since a RID has not been generated nor assigned, XML indexes remain incomplete. As the parsing involves inserting index keys from each XML document into a shared sort, the parsing is also incomplete as the index keys are incomplete and cannot be inserted into the shared sort, as they are directly related to the RIDs which have yet to be generated.

A possible approach is to reposition the level of processing to be coincident with that of the ridder. However, this option is not practical, in time or effort, as the ridder is limited in quantity, is highly dependent for its present functions and such a repositioning would then require the ridder to be directly engaged in the inserting aspects of a defined index key which would be known only once its respective RID was generated by the ridder.

Another possible approach is to provide an interim buffer of collected index keys. More particularly, when the XML document has been inserted and a RID has been assigned, the buffered collected index keys could be processed (ie. inserted into a sort or index) in relation to the respective and known RID. While this approach may be viable for situations lacking parallelism, such as for INSERT/index create, in a situation requiting parallelism, the resulting process and flow strain on the limited ridder resource would severely degrade the opportunity for parallelism (e.g., in LOAD).

As a result, parallelism is degraded, performances are limited and a system constraint on the generation of RID, the insertion of index keys and the timely creation of builds occurs. There is therefore a need for a method for sustaining database processing parallelism of one or more parallelized processes while overcoming the RID issues. The present invention addresses such a need.

SUMMARY OF THE INVENTION

In one implementation, a method for sustaining database processing parallelism of one or more parallelized processes to build one or more index pages using pseudo record identifiers (PRIDs) is disclosed. The method comprises generating one or more PRIDs for one or more respective internal record formats (IRFs), inserting said generated PRIDs into a respective index key, generating a relational index of the PRID and a predetermined record identifier (RID) respectively determined in relation to said IRF, and building one or more index pages in relation to the relational index by comparing said RID and said PRID for their respective IRF in said relational index, and determining which one of said RID or said PRID to insert into said index page.

In another implementation, a computer program product for substituting a record identifier for an index value in a database process is disclosed. The computer program product comprises a computer-readable storage medium having computer-readable program code portions stored therein, the computer-readable program code portions comprising: a first executable portion capable of: (a) generating one or more pseudo record identifiers (PRIDs) for one or more respective internal record formats (IRFs), (b) inserting said generated PRIDs into a respective index key, (c) generating a look up table relating the PRID and a predetermined record identifier (RID) respectively determined in relation to said IRF by a ridder, and (d) building an index page in relation to said PRID and said RID wherein said building further includes comparing said RID and said PRID for their respective IRF in said relational index, determining which one of said RID or said PRID to insert into said index page, and said ridder fetching one or more ordered rows to begin to build an index page.

DETAILED DESCRIPTION

The present invention relates generally to databases and more specifically to a method for sustaining database processing parallelism of one or more parallelized processes.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In one implementation, the method of the present invention generates pseudo RIDs, inserts generated pseudo RIDs into respective index keys, and generates a relational index of the pseudo RIDs and the respective actual RIDs as determined to maintain parallelism in processing for one or more processes.

Figure 1A:
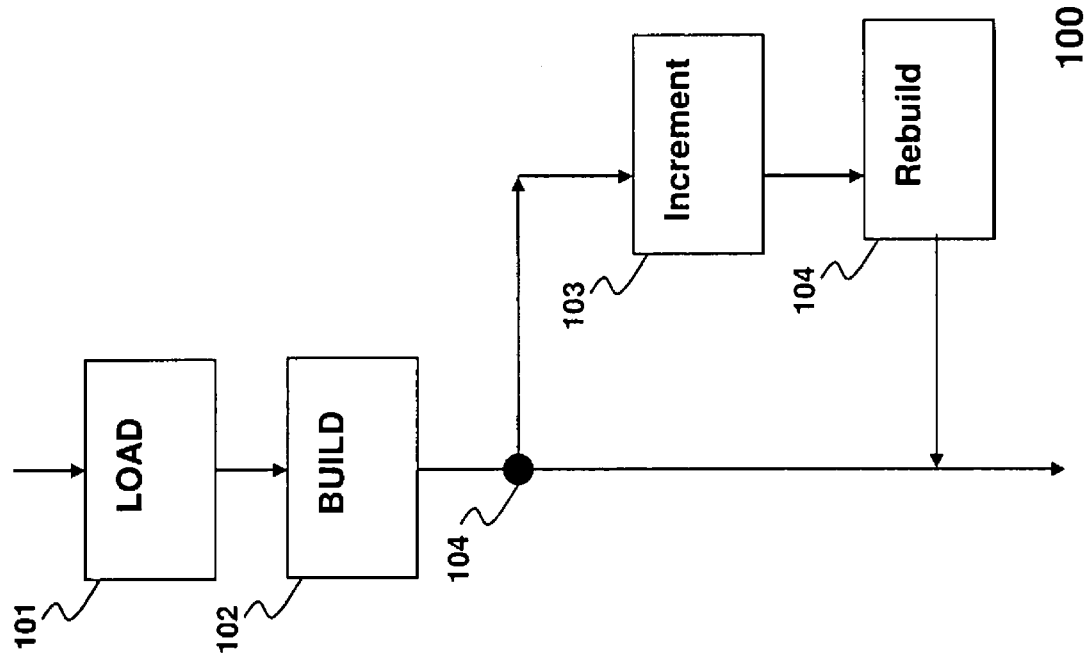
FIG. 1A depicts an overview of the general processes of an implementation of the present invention.

FIG. 1A depicts an overview 100 of the general processes of an implementation of the present invention.

In FIG. 1A, an overarching flowchart 100 is depicted which generally sets forth flows of the present invention which begin with a Loading Phase 101 for generating a pseudo RID (PRID), then a Build Phase 102 for determining a RID from the relational index, and optionally Incremental Mode 103 and Rebuild Mode 104. The optional modes are dependent upon on the calls and the index keys present, respectively.

Figure 1B:
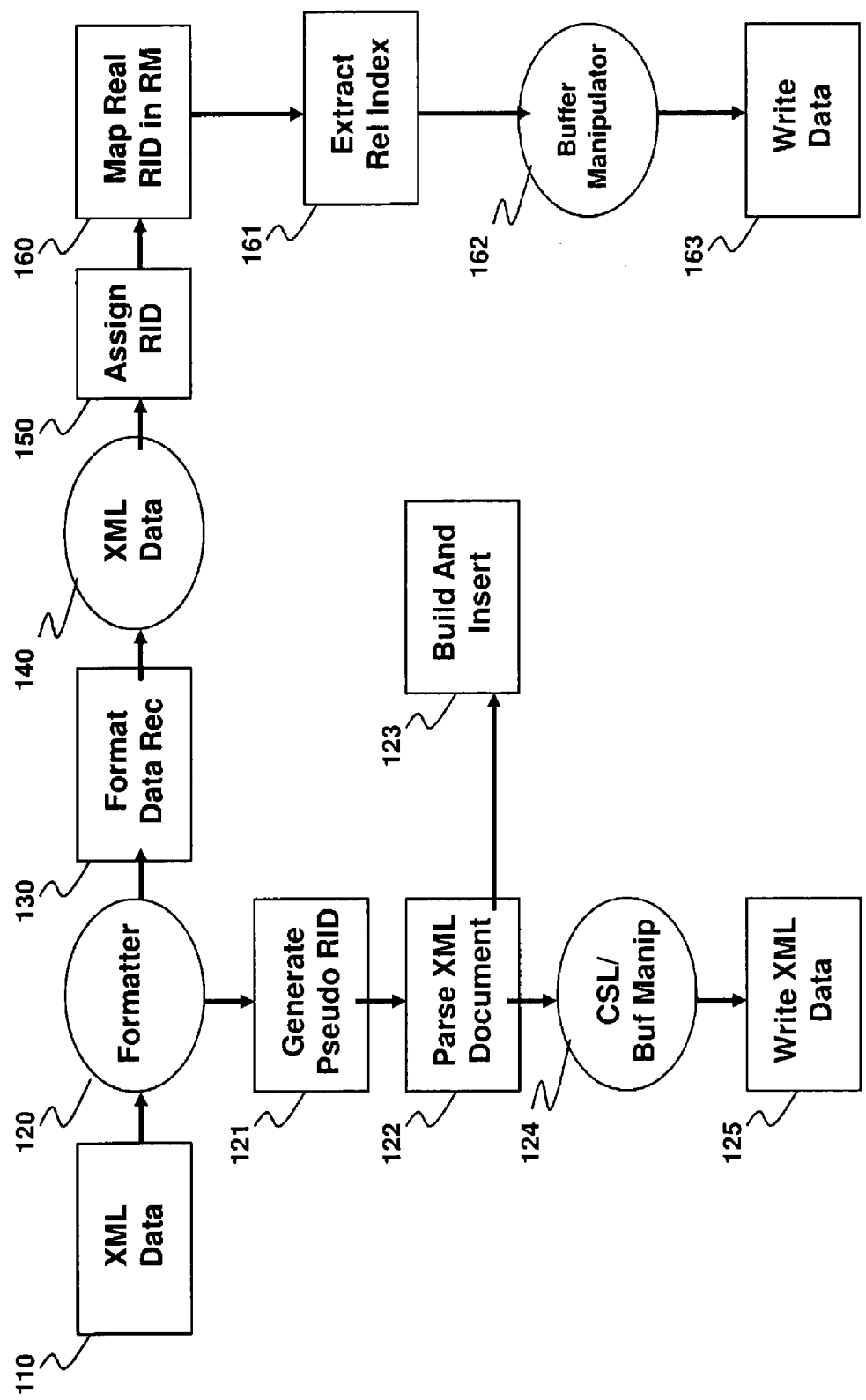
FIG. 1B depicts an overview of the Loading Phase of an implementation of the present invention; and, FIG. 2 depicts an overview of the Building Phase of an implementation of the present invention.

FIG. 1B depicts an overview 199 of the Loading Phase of an implementation of the present invention.

In FIG. 1B, XML data 100 arrives at the formatter 120. The formatter 120 assesses the XML data. The formatter calls "xmls_StartDocumentState," and it will call "sqluXmlGetPseudoRID" to generate a pseudo RID (PRID) at 121 for the respective data record since the actual RID remains unknown at this stage. In an alternate implementation, a (PRID) is called by the formatter at 121 for the respective data record since the actual RID remains unknown at this stage, where the PRID may further include an intervening step, value substitution, or further value assignment. Where the formatter encounters an XML column, the formatter calls "sqldFormatXDADesc( )" to begin the calls to XMRN and XMS to parse and write out the data at 122. Concurrently, even though the actual RID remains unknown at this stage, the index keys and the like are being built for the sort files at 123. After parsing, data is passed to the CSL/Buffer manipulator at 124 and XML Data out is written to XDA at 125.

Also in FIG. 1B, the regions, paths, and values index keys are accumulated in a single pass and inserted into separate sorts at 123. For the values index keys, the PRID is used for the RID keypart. For the regions index keys, the PRID is an additional column in the sort key as the RID keypart is for the XDA and not the base table RID. Once the ridder 140 accepts a formatted data record of 130 created by the formatter 120, it can then determine and assign a RID at 150. At 150, an entry will be generated into the RID mapper (i.e., relational index) at 160 indicating that the PRID will map into the actual RID just determined (i.e., generated). Once the RID is determined, extraction of the relational index keys at 161 is undertaken, then buffer manipulation at 162, and the complete data record is written at 163.

Figure 2:
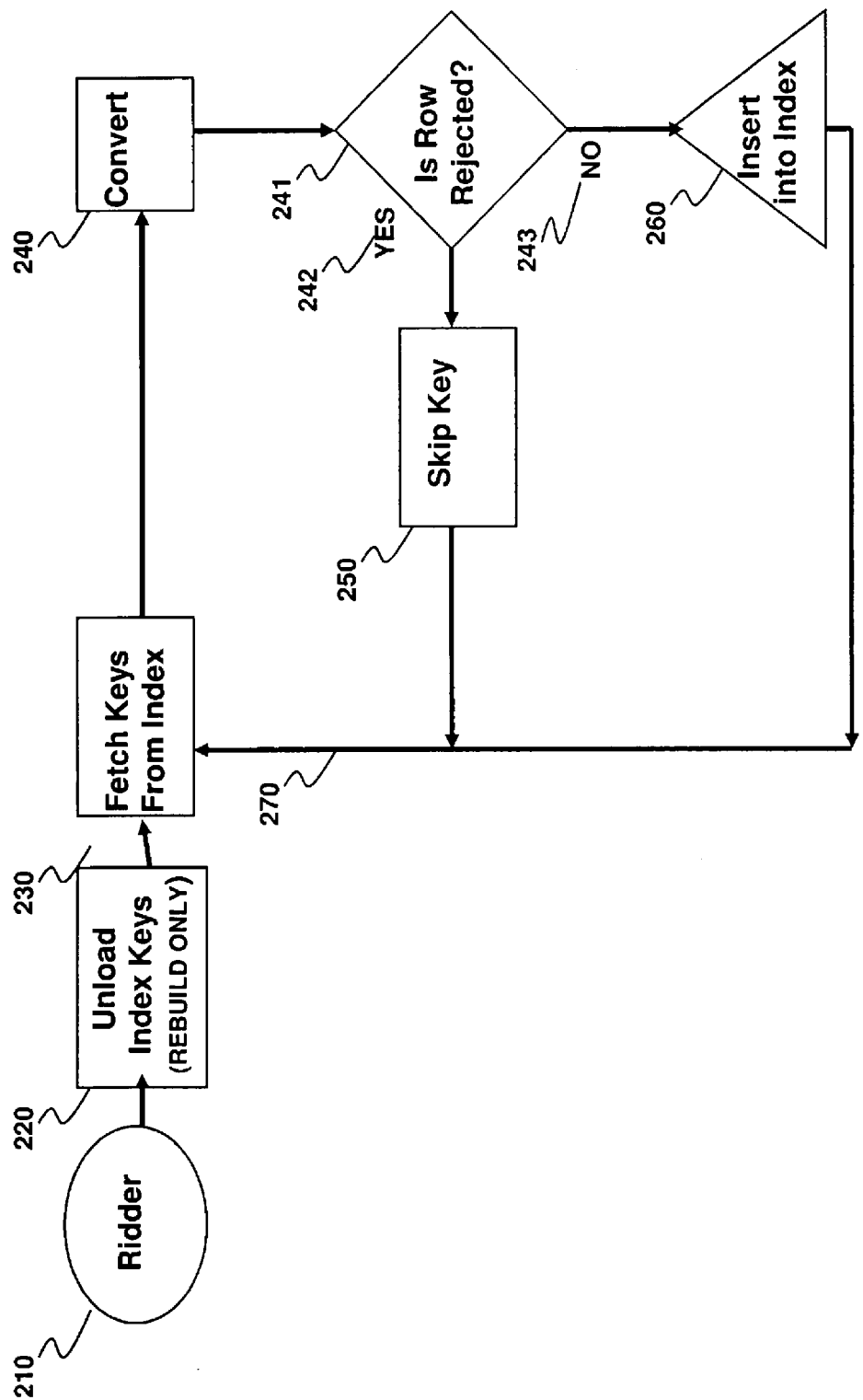

FIG. 2 depicts an overview 200 of the Building Phase of an implementation of the present invention.

In FIG. 2, the ridder 210 (also referred to as 140 of FIG. 1) generally opens the sorts and the fetching from the sorts. The ridder also calls "squBuildIndexes( )" to either add the new index keys to existing indexes (i.e., in incremental mode) or completely rebuild the indexes (i.e., in rebuild mode). At 220, keys are inserted into corresponding sorts that already contain keys from newly loaded documents for XML indexes, fetch existing keys from regions, paths, and values indexes during a rebuild mode only. Similarly, for relational indexes, at 220, scan the table and extract keys for all relational indexes in parallel and insert into sort files.

Also in FIG. 2, at 230, for each index, a key is fetched from the index sort file. At 240, for values and regions indexes, the RID mapper is used to convert the PRID in the sort entry to the actual RID value. In an alternate implementation, the RID mapper is a look up table that is used to convert the PRID in the sort entry to the actual RID value. At 241, for values and regions indexes, the rejection of the row is checked, where if it is rejected at 242, then inserting the key is passed at 250. Where if the row is not rejected, at 243, the key is inserted into the index at 250. The index is then built from the leaf pages upwards. The process then loops back along 270 to process the next sort entry. Additionally, the Build Phase is alternatively recognized as being a Rebuild mode with existing index data.

In incremental mode, "squBuildIndexes( )" will call "squExtendIndexes" to add the new keys to existing indexes. Then "squExtendIndexes( )" will loop through the IXCB chain and for each of the indexes to be loaded, it will call "squMapItokenToSortBucket( )" to find the matching sort for that respective index. "sqluDMSortGetCurRidAndFlag( )" is then called to retrieve the PRID from the sort. Similarly, for values indexes, "sqluXmlResolvePseudoRID( )" is called to consult the RID mapper (i.e., relational index) and convert the PRIDs into actual RIDs. "sqliaddk( )" is called to insert the key into the index. However, if the PRID maps to SQLI_NO_RID, then the key will not be inserted into the index since the base row was rejected. For an online load, the LOAD and PUNC bits will be set in the rid flags as is currently done.

In Rebuild Mode, there are two aspects. In a first aspect, if the existing index keys are present, "squRebuildIndexes( )" will call "squPrefetchAndSortInxKeys( )" which in turn calls "sqluProcessExistingXmlIndexes( )." "sqluScanIndexAndInsertIntoSort( )" will then fetch the existing keys from the regions, paths, and values indexes and insert the keys into the corresponding sort files that already contain keys from the newly loaded documents. "squInitInxObjForRebuild( )" will then re-initialize the index object. For online load, the index will be built in a separate shadow object as is currently done.

In a second aspect, "squRebuildIndexes( )" loops through the IXCB chain and for each index to rebuild, calls "squMapItokenToSortBucket( )" to find the matching sort for that respective index. "sqlicri( )" is then called to create the index from the sort keys. For a values index or regions index, "sqliLoadInxBld( )" will call convert the PRIDs into actual RIDs. If the row is rejected (i.e., actual RID=SQLI_NO_RID), then the key is skipped (i.e. passed). If the row is not rejected, then the key is inserted into the index.

For the present invention, in the build of the index pages, in one implementation, a lookup table is used to determine the actual RID value that should be put onto the index page. In this implementation, unique indexes on XML columns may be accommodated such that once an index key is determined to violate a unique constraint, the corresponding PRID is used and its entry in the lookup table is modified such that all index keys with this pseudo RID are effectively ignored.

Operationally, the present invention is able to provide is a rapid method of marking a range of index keys to be excluded from the final unique index that is thereafter built.

As used herein, the term "parallelism" means an ability to execute one or more statements, perform I/O, or run certain utilities such as backup, restore or load across multiple processors, for example. It is understood that IBM's DB2 UDB supports at least two types of parallelism including intra-partition parallelism and inter-partition parallelism. It is further recognized that DB2 UDB is capable of performing parallel operations for the following, by example: (1) Query Parallelism, (2) I/O, and (3) Utilities. For Query Parallelism, DB2 UDB is able to perform (a) inter-query parallelism, (i.e., the ability for a database to accept queries from multiple applications at the same time); and (b) intra-query parallelism (i.e., the ability to process multiple parts of a query at the same time). For I/O, DB2 UDB is able to perform parallel I/O to one or more I/O devices. For Utilities, DB2 UDB is able to perform backup, restore, load, and index creation and can also benefit from it ability of intra-parallelism.

Operationally, "db2lrid" is a single process in DB2 UDB which performs the index sort and builds the index RIDs during the LOAD, recognizing that this process is not present in a non-parallel database instance, i.e. where INTRA_PARALLEL is disabled. The "db2lrid" process performs the functions: SMP synchronization; Allocate RIDs; build the indexes; and it also controls the synchronization of the LOAD formatter processes.

Operationally, "db2lload" is a subagent process responsible for carrying out the loading on each database partition. It spawns the formatters, ridder, buffer manipulators and media writer EDUs and generally provides oversight.

As used herein, the term "XML" (Extensible Markup Language) means a standard, developed as a specification by the World Wide Web Consortium, for creating markup languages which describe the structure of data. It is also recognized that while XML is not a fixed set of elements like hypertext markup language (HTML), it is more similar to Standard Generalized Markup Language ("SGML") in that it is a meta-language, which in effect, describes languages. Further, it is recognized that XML typically enables authors to define their own tags.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

In addition to the processes and implementations of the present invention described thus far, the invention may also be used for database processes and computer-intensive activities involving the need for multiple concurrent processing as well as other steps containing the same or similar applications and uses.

What is claimed is:

1. A computer-implemented method for sustaining database processing parallelism of one or more parallelized processes to build one or more index pages using pseudo record identifiers (PRIDs), wherein the computer performs the following functions comprising:
generating one or more PRIDs by a formatter for one or more respective internal record formats (IRFs), wherein the PRID is a uniquely generated number to be used as a predetermined record identifier (RID) keypart;
inserting the generated PRIDs into a respective index key, as the RID is then sorted in parallel;
generating a relational index of the PRID and the RID respectively determined in relation to the IRF; and
building one or more index pages in relation to the relational index by comparing the RID and the PRID for their respective IRF in the relational index, and determining which one of the RID or the PRID to insert into the index page,
wherein the PRID will map into the RID.

2. The computer-implemented method of claim 1, wherein the building further comprises converting the PRID to the RID in a sort entry, and a ridder fetching one or more ordered rows to begin to build an index page.

3. The computer-implemented method of clam 2, wherein the formatter further generates a data record which is relationally associated with the IRF.

4. The computer-implemented method of claim 3, wherein a row is rejected for a region index replacing the building step with a bypassing step.

5. The computer-implemented method of claim 4, further comprising one or more of an incremental mode and a rebuilding mode executed concurrently with the building step.

6. A computer-implemented method for substituting a record identifier for an index value in a database process, wherein the computer performs the following functions comprising:
generating one or more pseudo record identifiers (PRIDs) by a formatter for one or more respective internal record formats (IRFs);
inserting the generated PRIDs into a respective index key, as a predetermined record identifier (RID) is then sorted in parallel;
generating a look up table relating the PRID and the RID respectively determined in relation to the IRF by a ridder; and
building an index page in relation to the PRID and the RID, wherein the building step further includes comparing the RID and the PRID for their respective IRF in the relationship index, and determining which one of the RID or the PRID to insert into the index page,
wherein the PRID will map into the RID.

7. The computer-implemented method of claim 6, wherein the building further comprises converting the PRID to the RID in a sort entry, and the ridder fetching one or more colored rows to begin to build an index page.

8. The computer-implemented method of claim 7, further comprising one or more of an incremental mode and a rebuilding mode executed concurrently with the building step.

9. A computer program product for substituting a record identifier for an index value in a database process, the computer program product comprising a computer-readable storage medium having computer-readable code portions stored therein, the computer-readable program code portions comprising:
a first executable portion capable of:
generating one or more pseudo record identifiers (PRIDs) for one or more respective internal record formats (IRFs), wherein the PRID is a uniquely generated number to be used as a predetermined record identifier (RID) keypart;

inserting the generated PRIDs into a respective index key, as the RID is then sorted in parallel;

generating a look up table relating the PRID and the RID respectively determined in relation to the IRF by a ridder; and building an index page in relation to the PRID and the RID, wherein the building further includes comparing the RID and the PRID for their respective IRF in the relationship index, determining which one of the RID or the PRID to insert into the index page, and the ridder fetching one or more ordered rows to begin to build an index page, wherein the PRID will map into the actual RID.

10. The program product of claim 9, further comprising one or more of an incremental mode and a rebuilding mode executed concurrently with the building step.

11. The computer program product of claim 9, wherein the building further comprises converting the PRID to the RID in a sort entry, and a ridder fetching one or more ordered rows to begin to build an index page.

12. The computer program product of claim 11, wherein a data record is further generated.

13. The computer program product of claim 12, wherein a row is rejected for a region index replacing the building step with a bypassing step.

14. A computer-implemented system for sustaining database processing parallelism of one or more parallelized processes to build one or more index pages using pseudo record identifiers (PRIDs), comprising:

a processor;

a memory;

means for generating one or more PRIDs by a formatter for one or more respective internal record formats (IRFs), wherein the PRID is a uniquely generated number to be used as a predetermined record identifier (RID) keypart;

means for inserting the generated PRIDs into a respective index key, as the RID is then sorted in parallel;

means for generating a relational index of the PRID and the RID respectively determined in relation to the IRF; and means for building one or more index pages in relation to the relational index by comparing the RID and the PRID for their respective IRF in the relational index, and determining which one of the RID or the PRID to insert into the index page, wherein the PRID will map into the RID.

15. The computer-implemented system of claim 14, wherein the building means further comprises converting the PRID to the RID in a sort entry, and a ridder fetching one or more ordered rows to begin to build an index page.

16. The computer-implemented system of claim 15, wherein the formatter further generates a data record which is relationally associated with the IRF.

17. The computer-implemented system of claim 16, wherein a row is rejected for a region index replacing the building step with a bypassing step.

18. The computer-implemented system of claim 17, further comprising one or more of an incremental mode and a rebuilding mode executed concurrently with the building step.

* * * * *